(12) United States Patent
Chen (10) Patent No.: US 10,234,928 B2
(45) Date of Patent: Mar. 19, 2019

(54) DISPLAY DEVICE, COMPUTER SYSTEM AND METHOD OF MANAGING THE OPERATING STATES OF A COMPUTER SYSTEM

(71) Applicant: Fujitsu Technology Solutions Intellectual Property GmbH, München (DE)

(72) Inventor: Angel Chen, Taipei (TW)

(73) Assignee: Fujitsu Technology Solutions Intellectual Property GmbH (DE)

( * ) Notice: Subject to any disclaimer, the term of this patent is extended or adjusted under 35 U.S.C. 154(b) by 120 days.

(21) Appl. No.: 15/116,346

(22) PCT Filed: Feb. 5, 2014

(86) PCT No.: PCT/EP2014/052254
§ 371 (c)(1),
(2) Date: Aug. 3, 2016

(87) PCT Pub. No.: WO2015/117648
PCT Pub. Date: Aug. 13, 2015

(65) Prior Publication Data
US 2017/0010654 A1  Jan. 12, 2017

(51) Int. Cl.
*G06F 1/32* (2006.01)
*G06F 1/3234* (2019.01)
(Continued)

(52) U.S. Cl.
CPC .......... *G06F 1/3265* (2013.01); *G06F 1/3231* (2013.01); *G06F 1/3287* (2013.01);
(Continued)

(58) Field of Classification Search
CPC .... G06F 1/3265; G06F 1/3203; G06F 1/3206; G06F 1/3231
See application file for complete search history.

(56) References Cited

U.S. PATENT DOCUMENTS 8,098,242 B2    1/2012   Chen et al.
8,421,277 B2    4/2013   Lück et al.
(Continued)

FOREIGN PATENT DOCUMENTS

| | | |
|---|---|---|
| EP | 2 000 881 A1 | 12/2008 |
| EP | 2 315 439 A1 | 4/2011 |
| WO | 2012/172679 A1 | 12/2012 |

OTHER PUBLICATIONS

VESA "Display Power Management (DPM) Proposal," Ver 1, Draft 4, Date: Sep. 19, 2002.
(Continued)

*Primary Examiner* — Terrell S Johnson
(74) *Attorney, Agent, or Firm* — DLA Piper LLP (US)

(57) ABSTRACT

A display device includes interface circuitry configured to receive a display signal from an external computing device; a display screen configured to display the received display signal; an energy management function configured to control an operating state of the display device; a sensor configured to provide at least one control signal indicative of the presence of a user in a predefined area in front of the display screen; and a control unit configured to select an energy saving mode from a plurality of energy saving modes based at least on the control signal provided by the sensor.

19 Claims, 4 Drawing Sheets

(51) Int. Cl.
    *G06F 1/3231*     (2019.01)
    *G06F 1/3287*     (2019.01)
    *G06F 1/3206*     (2019.01)
    *G06F 1/3203*     (2019.01)

(52) U.S. Cl.
    CPC .......... *G06F 1/3203* (2013.01); *G06F 1/3206* (2013.01); *Y02D 10/153* (2018.01); *Y02D 10/173* (2018.01); *Y02D 50/20* (2018.01)

(56) References Cited

U.S. PATENT DOCUMENTS

| | | | |
|---|---|---|---|
| 8,472,216 B2 | 6/2013 | Busch | |
| 2005/0071702 A1* | 3/2005 | Morisawa | G06F 1/3203 713/320 |
| 2009/0109015 A1* | 4/2009 | Ueno | G06F 21/316 340/500 |
| 2011/0101775 A1 | 5/2011 | Busch | |
| 2012/0050152 A1* | 3/2012 | Salminen | G09G 3/3406 345/156 |
| 2012/0163056 A1 | 6/2012 | Busch et al. | |
| 2012/0288139 A1* | 11/2012 | Singhar | G06F 1/3265 382/103 |
| 2013/0054998 A1* | 2/2013 | Wyatt | G06F 1/3265 713/323 |
| 2014/0313120 A1* | 10/2014 | Kamhi | G06K 9/00604 345/156 |

OTHER PUBLICATIONS

VESA "Display Data Channel Command Interface Standard," Version 1.1, Oct. 29, 2004.

VESA "Monitor Control Command Set Standard," Version 2.2a, Jan. 13, 2011.

* cited by examiner

DISPLAY DEVICE, COMPUTER SYSTEM AND METHOD OF MANAGING THE OPERATING STATES OF A COMPUTER SYSTEM

TECHNICAL FIELD

This disclosure relates to a display device comprising interface circuitry configured to receive at least one display signal, a display screen and an energy management function configured to control the operating state of the display device as well as a computer system comprising a display device and a computing device connected thereto and a method of managing the operating states of such a computer system.

BACKGROUND

Display devices are commonly used to display signals received from external electronic devices, in particular computing devices such as personal computers (PC). In particular, in office environments the display device itself or the computing device connected thereto are often left running for extensive periods of time, resulting in an unnecessary consumption of electrical energy. While the energy consumption of the individual devices has been decreasing due to advances in technology such as the widespread use of liquid crystal displays (LCD) rather than conventional cathode ray tubes (CRT), the ever increasing use of information technology (IT) still results in a considerable waste of electrical energy.

In this context, various solutions aimed at reducing power consumption of computing devices and display devices have been developed. In particular, most modern operating systems (OS) provide some form of energy management. Known operating systems, for example, the Microsoft Windows operating system family can usually be configured to send predetermined devices into an energy saving mode if a user ceases to perform input operations such as typing via a keyboard or handling a pointing device such as a computer mouse. In response thereto, components like hard disk drives (HDD) of the computing device can be deactivated or the processor can be switched into a standby mode, for example.

With regard to display devices in particular, the so-called Display Power Management Signaling (DPMS) standard of the Video Electronics Standards Association (VESA) provides a mechanism of switching a display device into a power saving mode. According to VESA DPMS, the display device can be switched into a standby mode, for example, by deactivating synchronization or similar control systems transmitted from the computing device to the display device. In response, the display device may deactivate a display screen or other electronic components.

While the described approaches have improved the energy efficiency of computer systems in general, they are not always effective. For example, a user needs to provide certain timeout periods for the deactivation of particular functions of a computer system. If the selected timeout period is too short, the user will be inconvenienced by the unexpected deactivation of parts of the computer system during relatively short input breaks. If the timeout period is too long, the energy efficiency of the computer system will be reduced by keeping its components in an operating state too long.

EP 2 000 881 A1 describes a computing system having an integrated display and an integrated energy management device. The electronic device further comprises a sensor indicating whether a user is present in front of the electronic device. In case the user is present in front of the electronic device, activation of a predetermined energy saving mode by the operating system can be prevented. Consequently, relatively short timeout periods for the activation of energy saving modes can be specified without inconveniencing the user.

While the described system has many advantages regarding energy efficiency of integrated computing devices, it is not applicable to computing devices without an internal sensor. Furthermore, the proposed solution still heavily depends on the proper configuration of an energy management system of the operating system of the computing device.

Therefore, it could be helpful to provide an alternative approach to managing the operating states of a computer system comprising at least one display device and at least one computing device connected thereto.

SUMMARY

I provide a display device for a computer system, including interface circuitry configured to receive a display signal from an external computing device; a display screen configured to display the received display signal; an energy management function configured to control an operating state of the display device; a sensor configured to provide at least one control signal indicative of the presence of a user in a predefined area in front of the display screen; and a control unit configured to select an energy saving mode from a plurality of energy saving modes based at least on the control signal provided by the sensor, wherein the control unit is configured to immediately select a first energy saving mode when an absence of the user is detected by the sensor and select a second energy saving mode, if a presence of the user is not detected within a predetermined first time period after entering the first energy saving mode, the energy management function is configured to control the operating state based on the selected energy saving mode, the brightness of the display screen is reduced in the first energy saving mode, and a backlight illumination unit of the display screen is completely deactivated in the second energy saving mode, and the interface circuitry is configured to transmit first control information regarding a determination of an operating state of the external computing device back to the external computing device when the second energy saving mode is entered.

I also provide a computer system including the display device for a computer system, including interface circuitry configured to receive a display signal from an external computing device; a display screen configured to display the received display signal; an energy management function configured to control an operating state of the display device; a sensor configured to provide at least one control signal indicative of the presence of a user in a predefined area in front of the display screen; and a control unit configured to select an energy saving mode from a plurality of energy saving modes based at least on the control signal provided by the sensor, wherein the control unit is configured to immediately select a first energy saving mode when an absence of the user is detected by the sensor and select a second energy saving mode, if a presence of the user is not detected within a predetermined first time period after entering the first energy saving mode, the energy management function is configured to control the operating state based on the selected energy saving mode, the brightness of the display screen is reduced in the first energy saving mode, and a backlight illumination unit of the display screen is completely deactivated in the second energy saving mode, and the interface circuitry is configured to transmit first control information regarding a determination of an operating state of the external computing device back to the external computing device when the second energy saving mode is entered; and a computing device connected to the display device, wherein the computing device comprises an energy management function configured to switch the computing device into an operating state based at least on the control information provided by the display device.

I further provide a method of managing the operating states of a computer system including a display device and an external computing device, the method including sensing an absence of a user of the computer system from a predefined area in front of the display device; selecting, by a control unit of the display device, a first energy saving mode from a plurality of energy saving modes in response to the sensed absence of the user and a second energy saving mode from the plurality of energy saving modes in response expiry of a predetermined first time period after entering the first energy saving mode; controlling the operating state of the display device based on the selected energy saving mode, wherein brightness of the display screen is reduced in the first energy saving mode and a backlight illumination unit of the display screen is completely deactivated in the second energy saving mode; transmitting control information from the display device to the external computing device when the second energy saving mode is entered; and controlling the operating state of the external computing device based at least on the transmitted control information.

LIST OF REFERENCE SIGNS

100 computer system
110 display device
120 printed circuit board
130 interface
140 controller
150 display screen
160 sensor
170 computing device
180 energy management function
190 software module
M2-0 normal operating mode
M2-1 first energy saving mode
M2-2 second energy saving mode
M2-3 third energy saving mode
M2-4 fourth energy saving mode
S3-0 active state
S3-1 suspend state
S3-2 sleep state
S3-3 off state
400 computer system
410 display device
420 printed circuit board
430 microcontroller unit
440 USB hub
450 downstream port
460 upstream port
470 computing device
480 graphics controller
490 USB host controller

DETAILED DESCRIPTION

My display device comprises interface circuitry configured to receive a display signal from an external computing device, a display screen configured to display the received display signal, and an energy management function configured to control the operating state of the display device. Furthermore, the display device comprises a sensor configured o provide at least one control signal indicative of the presence of a user in a predefined area in front of the display screen and a control unit configured to select an energy saving mode from a plurality of energy saving modes based at least on the control signal provided by the sensor. The energy management function is configured to control the operating state of the display device based on the selected energy saving mode. Furthermore, the interface circuitry is configured to transmit control information regarding a determination of an operating state of the external computing device back to the external computing device.

The described display device can enter an energy saving mode irrespective of the control of an external computing device. Therefore, the energy efficiency of at least the display device can be improved irrespective of the setting of an energy management function of an operating system. Furthermore, by the transmission of control information regarding a determination of an operating state of the external computing device, the energy management of an attached computing device can also be controlled based on the control signal provided by the sensor. Among others, my display device recognizes that there is an important human interface between a user and the computing device and can therefore better control the energy saving mode of the computer system than the computing device itself.

The interface circuitry may comprise at least one of a Video Graphics Array (VGA) interface, Digital Visual Interface (DVI), High Definition Multimedia Interface (HDMI), or DisplayPort (DP) interface and is configured to transmit the control information based on the Display Data Channel Command Interface (DDC/CI) interface, in particular using the DDC2Bi protocol and/or the monitor control command set (MCCS). The use of a bidirectional communication channel of an interface used to provide the display signal to the display device facilitates integration into existing computer systems.

The interface circuitry may comprise a Universal Serial Bus (USB) controller and is configured to transmit the control information using the USB controller to the external computing device. In particular, an upstream port of a USB hub integrated into the display device may be used to transmit back control information from the control unit of the display device to the computer system. For example, sensor data could be transmitted using the USB device class and associated driver software used for human interface devices (HID) and in this way be provided to an energy management function of an operating system of the computing device.

The control information may comprise an interrupt request, in particular an unsolicited attention call, to alert the external computing device to the selection of an energy saving mode by the control unit.

The control information may comprise control data regarding the presence of the user in the predefined area in front of the display screen, an energy saving mode selected by the control unit of the display device and/or a requested operating state of the external computing device. Each piece of information may be used by the external computing device to enter an appropriate operating state.

The energy management function may be configured to select at least a suspend state, a sleep state and/or an off or standby state of the display device. In the suspend state, the display screen may be switched off or operated with reduced brightness and at least one other circuit component of the display device, in particular the sensor and/or a scaler, remain in a normal operating state. Hence, while energy consumption of the display device can be reduced in the suspend state, most other operations, including a wake-up operation of the display device, remain available. In the sleep state, both the display screen and the at least one other circuit component may be switched off to save even more electrical energy. Lastly, in the off or standby state, essentially all circuit components not required to switch the display device back into an active state may be switched off. For example, an off state may be selected and deselected by a user manually by pressing a power button on the front of the display device. In this state, an automatic wake-up operation of the display may no longer be available for the benefit of increased power saving.

The display device may further comprise at least one timer function, wherein the control unit is configured to select the first energy saving mode in response to detection of the absence of a user in the predefined area in front of the display device and at least one second energy saving mode in response to the expiry of the timer after the detection of the absence without any intervening detection of a presence of the user in the predefined area in front of the display screen. The described configuration allows the immediate reduction of energy consumption of the display device without any waiting time. However, after a predetermined waiting time, further components such as internal components of an external computing device, may also be deactivated.

My computer system comprises a display device as described above and a computing device connected to the display device. The computing device comprises an energy management function configured to switch the computing device into an operating state based at least on the control information provided by the display device. For example, by provision of an additional or modified software module of an energy saving component of an operating system, the energy saving component may be configured to switch the computing device into an appropriate energy saving mode based on the control signal provided by the sensor of the display device.

The energy management function may be configured to read a manufacture-specific control variable of the display device on occurrence of at least one of an interrupt request transmitted by the display device or a timeout of a timer of the computer system. Querying manufacture-specific control variables allows the energy management function of a computer system to consider information provided by the display device.

My method of managing the operating states of a computer system may comprise:
sensing an absence of a user of a computer system from a predefined area in front of the display device;
selecting, by a control unit of the display device, an energy saving mode from a plurality of energy saving modes in response to the sensed absence of the user;
controlling the operating state of the display device based on the selected energy saving mode;
transmitting control information from the display device to the external computing device; and
controlling the operating state of the external computing device based at least on a transmitted control information.

The above-mentioned method steps can be used to implement a display device driven energy management in a computer system comprising a computing device and an external display device.

The method may further comprise:
sensing a presence of a user of the computer system in a predefined area in front of the display device;
selecting, by the control unit of the display device, a normal operating mode in response to the presence of the user;
controlling the operating state of the display device based on the selected normal operating mode;
transmitting wake-up information from the display device to the external computing device; and
controlling the operating state of the external computing device based at least on a transmitted wake-up information.

By also providing wake-up information from the display device to an external computing device, the display device can also act as a wake-up source for the energy management of a computer system. Accordingly, the operating state of the computing system may be completely controlled by the display device attached to it.

Further details are disclosed in the description of examples provided below. The various examples are described with reference to the attached drawings.

Figure 1:
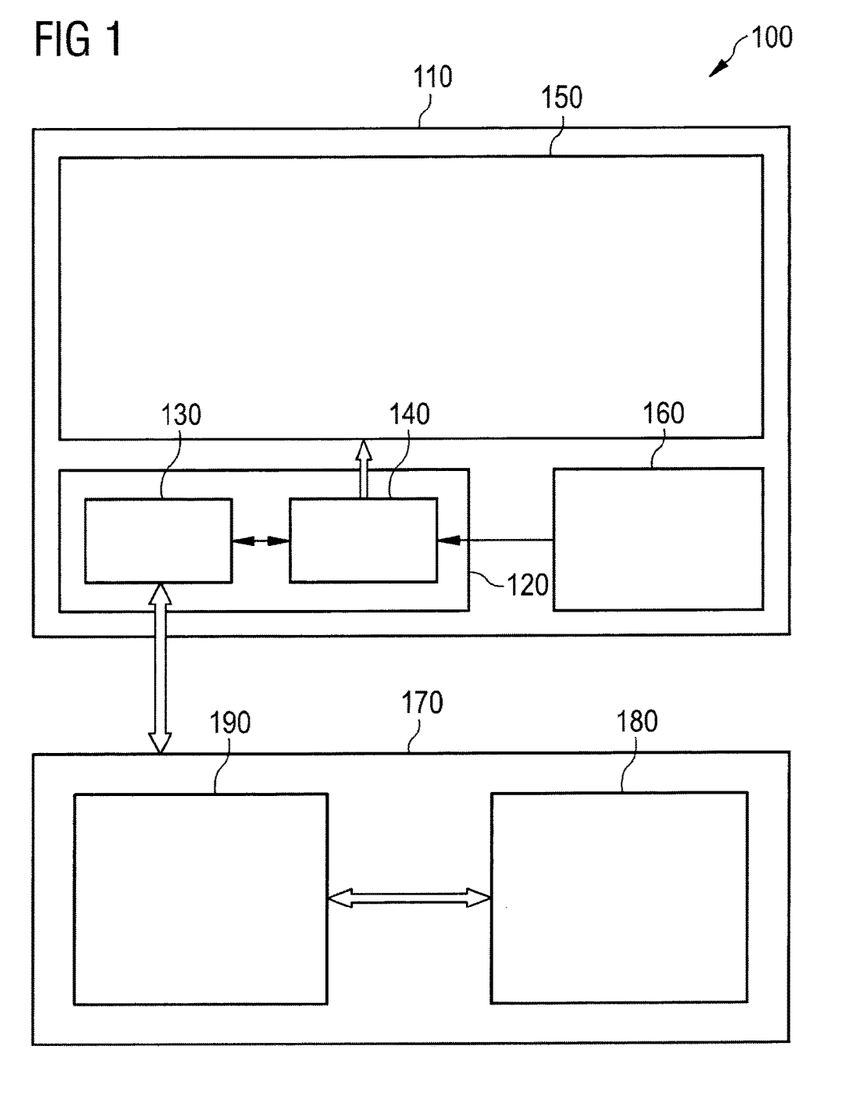
FIG. 1 shows a computer system according to a first example.

FIG. 1 shows a schematic arrangement of a computer system 100 comprising a display device 110 and a computing device 170. The display device 110 comprises a printed circuit board 120, for example, a so-called scaler board. The printed circuit board 120 comprises various electronic components such as an interface 130 to connect the display device 110 to the computing device 170 using appropriate interface circuitry and connectors such as VGA, DVI, HDMI or DP. Furthermore, the printed circuit board 120 comprises at least one controller 140 operable to transform received display signals from the interface 130 to a format suitable for display by a display screen 150 of the display device 110.

The controller 140 is further configured to perform energy management based on sensor signals provided by a sensor 160 integrated into the display device 110. In the example, the sensor 160 is a so-called long distance proximity sensor (LDPS) that measures reflected infrared energy to detect the presence of a person in front of the display screen 150. Other sensor technologies include ultra sound sensors or cameras attached to advanced digital image analysis systems. To detect the presence of a user in front of the display device 110 in general and in front of the display screen 150 in particular, the sensor 160 is integrated into a housing of the display device 110, for example, in the lower right corner of a front bezel.

The LDPS sensor 160 comprises a photodiode, amplifiers and analog or digital circuits integrated into a single integrated circuit (IC). It provides an output signal according to the Inter-Integrated Circuit ($I^2C$) interface protocol, which can be easily processed by the controller 140 of the printed circuit board 120. The sensor 160 detects a user's presence or absence in front of the display device 110 by detecting the distance between the user and the display screen 150. This information is analysed by the controller 140 and used to control the operating state of the display device 110, and, optionally, the operating state of the computing device 170 as detailed below.

The controller 140 provides control data indicating the presence or absence of a user in front of the display device 110 by a so-called manufacturer-specific virtual control panel (VCP) in the monitor command control set (MCCS) language. For example, a data value of 00h may be used to indicate the presence of a user while a data value of 01h may be used to indicate the absence of a user in a VCP with the code E0h. In the VESA DDC standard, VCP codes E0h to FFh are reserved for manufacturer specific functions. VCP data may be transmitted using the so-called DDC2Bi protocol over one or more known electrical interface connectors such as VGA, DVI, HDMI and DP. Alternatively, the sensor data provided by the sensor 160 may be transmitted essentially unchanged to the computing device 170. For example, using appropriate data lines such as a serial clock line (SCL) and a corresponding data line (SDA) of a VGA, DVI, HDMI or DP cable, the sensor data may be transmitted directly using the $I^2C$ protocol.

The control information provided by the controller 140 via the interface 130 is received by a graphics component (not shown) of the computing device 170 such as a graphics board or an integrated graphics controller. This information is provided to an energy management function 180 using an additional software module 190. For example, the energy management function 180 maybe the built-in energy management system of an operating system such as Microsoft Windows 8 or another known operating system. The software module 190 may be a vendor-specific driver software providing the DDC communication between the display device 110 and the energy management function 180. The effect the received control information has on the energy management function 180 will be described below with reference to FIG. 2.

Figure 2:
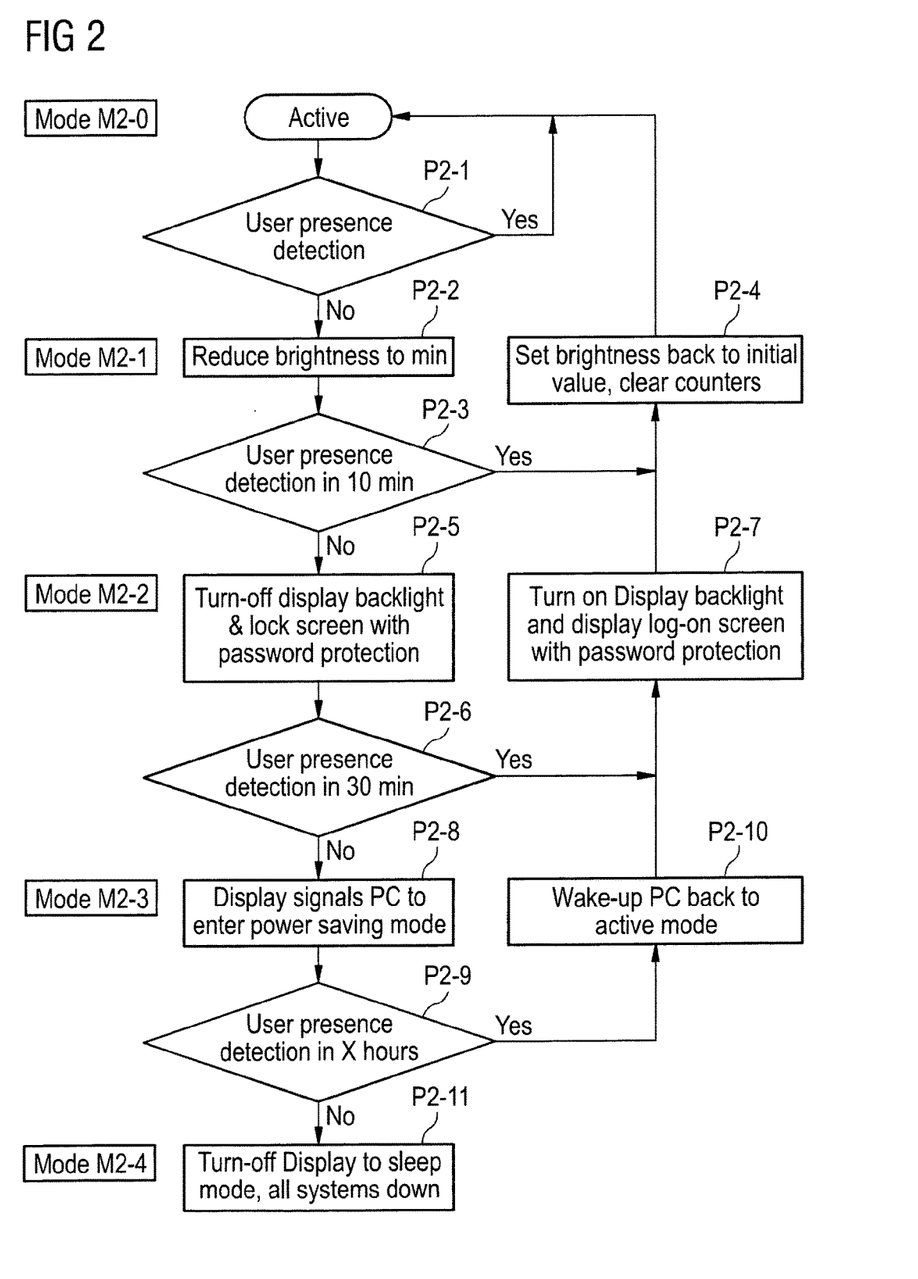
FIG. 2 shows a flowchart regarding the operating states of the computer system of FIG. 1.

FIG. 2 shows a combined flow and mode diagram of a computer system. Below, operation of the display device 110 and the computing device 170 in accordance with FIG. 1 are used as an example.

Initially, the computer system 100 is in a normal operating mode M2-0. In this mode, most components of the computer system 100, including all electronic components of the display device 110 and the components of the computing device 170 shown in FIG. 1 are in a fully active state. Nonetheless, the computer system 100 may comprise further components temporarily not used such as a printer, which can remain in a state of reduced functionality even in the mode M2-0. The computer system 100 remains in the mode M2-0 as long as the presence of a user is detected by the sensor 160 in step P2-1.

If the absence of the user is detected by the sensor 160, the computer system 100 enters a first energy saving mode M2-1. Upon entering the energy saving mode M2-1, the brightness of the display screen 150 is immediately reduced in a step P2-2. At the same time, a timer, for example, a built-in timer of the controller 140, is started to determine the length of the absence of the user.

Upon return of the user, the sensor 160 will provide a corresponding user presence signal. If the return of the user is detected, in a step P2-3, within a relatively short, first time period, for example, ten minutes the brightness of the display screen 150 is returned back to its initial value in a step P2-4 and the timer is cleared. Subsequently, the computer system 100 returns into the normal operating mode M2-0.

Alternatively, if the user does not return in the predetermined first time period, the computer system 100 will enter a second energy saving mode M2-2. In this energy saving mode, the backlight illumination unit of the display screen 150 will be completely deactivated by the controller 140. Furthermore, in a step P2-5, the controller 140 will provide control information back to the computing device 170 regarding entering the second energy saving mode M2-2. This information will be received, for example, by the energy management function 180. In response, the computing device 170 will lock its screen such that the user, upon his return, must provide a password or other login credentials to unlock the computing device 170. While this does not necessarily contribute to an energy saving on the part of the computing device 170, it greatly increases data security of the computer system. In particular, during recognized absences of the user of the computer system 100, the document or documents a user was working with are protected against access from unauthorized users.

If in step P2-6, return of a user is detected within a second prescribed time period, for example, 30 minutes from the initially detected absence, the backlight unit of the display screen 150 is switched back on in a step P2-7 and returns to its initial brightness in step P2-4. Furthermore, as the energy management function 180 has blocked the computing screen 170, a corresponding login screen will be displayed to the user of the computer system 100.

If the user does not return within the second time period, the computer system 100 will enter a third energy saving mode M2-3. Therein, in a step P2-8, the controller 140 will send appropriate control information to the computing device 170 requesting the computing device 170 to enter a power saving state. For example, the controller 140 may transmit a VCP code specifying the user's absence and that a corresponding power saving state should be selected by the energy management function 180. The power saving state to be used may be either specified by the controller 140 directly as part of the control information or maybe determined by the energy management function 180 in response to the general information from the controller 140 that an energy saving state should be entered. Examples of suitable energy saving states are specified, for example, in the Advanced Configuration and Power Interface (ACPI) standard and comprise the ACPI states ACPI-S4 ("hibernate" or "suspend to disk"), ACPI-S3 ("standby" or "suspend to RAM") or ACPI-S2 ("sleep").

If, in a step P2-9, the return of the user is detected within a third time period, for example, two hours from the start of the detected absence, the controller 130 will send an appropriate control code back to the computing device 130. For example, the graphics board of a computing device 170 may be configured as a wake-up source by the software module 190 and may be woken up by a so-called unsolicited attention call acting as an interrupt request. Accordingly, in a step P2-10, the energy management function 180 will wake up the computing device 170 by returning to a normal operating state such as ACPI-S0 ("working"). Correspondingly, in the steps P2-6 and P2-4, the display device 110 is also returned to a fully active state.

If, however, in step P2-9, no user presence is determined for the third time period, the computer system 100 will enter a fourth energy saving mode M2-4. Therein, in a step P2-11, the controller 140 issues control information requesting the computing device 170 to be fully switched off. For example, a state transition to the ACPI-S5 state ("soft off") or an even lower state may be requested. For example, U.S. Pat. No. 8,472,216 as well as US 2011/101775 A1 and US 2012/163056 A1 disclose circuits for power supply units capable of reducing the energy consumption of a computer system in a standby state even further. Furthermore, the controller 140 will deactivate all components of the display device 110, including the sensor 160, a display screen 150 and PCB 120. Consequently, the return of the user can no longer be automatically detected by the display device 110. To re-enter the normal operating mode M2-0, a user of the computer system 100 must therefore press an appropriate control button such as a power on button of the display device 110 or the computing device 170 to return to the normal operating mode M2-0.

While the operation presented with respect to the flowchart of FIG. 2 and detailed above makes use of a normal operating mode M2-0, three intermediate energy saving modes M2-1 to M2-3 and a further, completely switched off, energy saving mode M2-4, attention is drawn to the fact that the controller 140 may provide more or less energy saving modes, and/or that the energy management function 180 may implement more or less operating states. In particular, the display device 110 can be programmed to go sequentially through all or only selected ones of the energy saving modes M2-1 to M2-4 described above or alternatively to directly go into any of the described modes as required by the system design or configured by a user.

Furthermore, while the above-mentioned description only concerns components of the display device 110 and the computing system 170, the controller 140 may be programmed to keep other electrical function blocks active such as a USB hub, a scaler, an audio component and the like in selected energy saving modes such as modes M2-2 and M2-3. Keeping selected electrical function blocks active helps to immediately recover the display device 110 on occurrence of a detection of the user presence. Alternatively, such additionally function blocks may also be turned off one by one as defined by the system design or configured by a user to reach a lower power consumption of the computer system 100.

As detailed above, integrating the user detection into a display system 110 and managing various energy saving modes via the controller 140 of the display device 110 has various advantages. First, the power saving mode M2-1 can be entered immediately after detection of the absence of a user without the need for any waiting period. Furthermore, information security of the computer 100 as a whole can be improved by the energy saving mode M2-2. Moreover, a very fast recovery from the first and second energy saving modes M2-1 and M2-2 can be enabled, leading to greater acceptance of the energy management by a user of the computer system 100. Finally, the energy saving modes M2-1, M2-2 and M2-3 can be left automatically upon detection of a return of the user.

Figure 3:
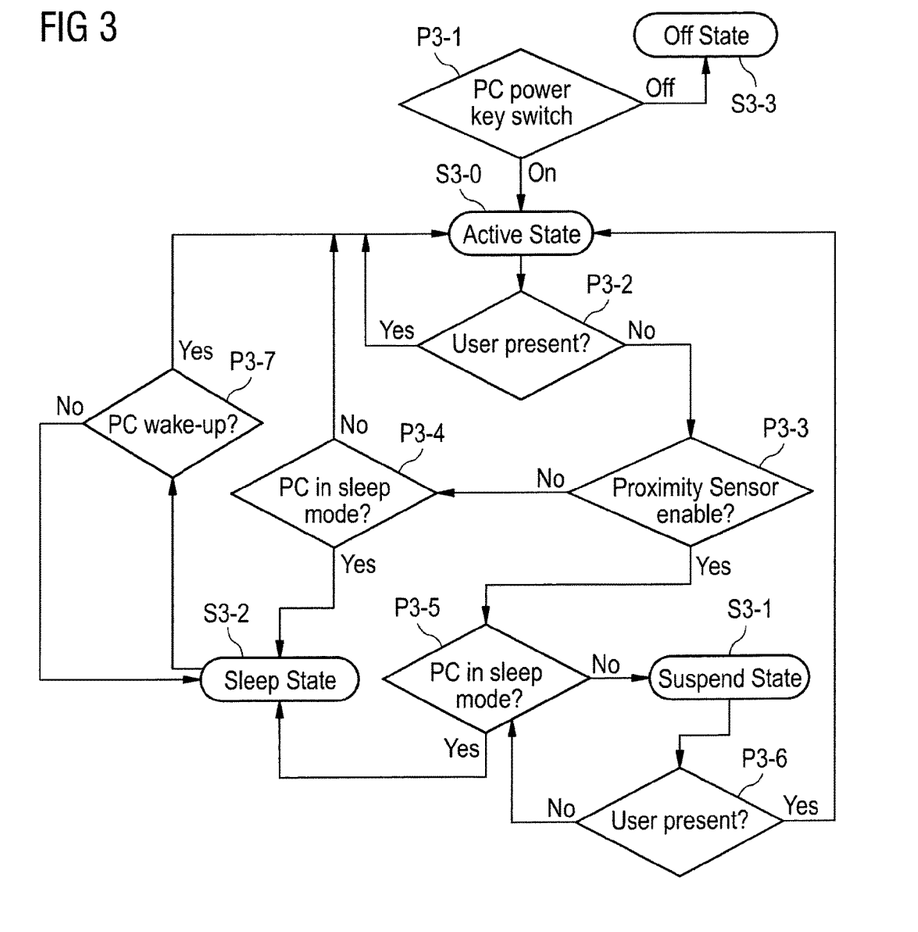
FIG. 3 shows a flowchart regarding the operating states of the computer system of FIG. 1.

FIG. 3 shows an internal state diagram of the display device 110 of the computer system 100 in accordance with FIG. 1. By the description provided below, it will become apparent how a display device driven energy management system can co-exist and/or co-operate with existing, operating system driven energy management system such as VESA DPMS. In particular, even in the absence of a vendor specific software module 190, at least some power saving of the display device 110 may still be achieved.

At any time, the display device 110 may be switched in a step P3-1 from any operating state into an off state S3-3 by a power button. In the off state S3-3, the energy consumption of the display device 110 is as low as possible. In particular, only a discrete electronic circuit may be provided with operational energy to reactive the display device 110. The energy required for operation of the circuit may be supplied as a standby voltage provided by either a power supply unit of the display device 110 or, alternatively, by the computing device 170 through an auxiliary voltage supply line of the display signal interface. Appropriate power supply circuits, suitable to implement display devices causing practically no power losses in standby are described, among others in U.S. Pat. No. 8,421,277 and U.S. Pat. No. 8,098,242.

From the off state S3-3, by pressing the power button again in step P3-1, the display device 110 may be switched into an active state S3-0. In the active state S3-0, in a step P3-2, the presence of the user is monitored by the sensor 160. As long as the presence of a user is detected in step P3-2, the display device 110 remains in the active state S3-0.

If the absence of a user is detected in step P3-2, in a subsequent step P3-3, the controller 140 checks whether the proximity sensor 160 is generally enabled. If this is not the case, i.e., if user detection by the display device 110 has been deactivated, the display device 110 will operate in accordance with standard energy saving protocols such as VESA DPMS. For this purpose, in a step P3-4, the controller 140 will check whether a connected computing device 170 is in a sleep mode, for example, if it has entered one of the ACPI sates S2, S3, or S4. If the computing device 170 is not in a sleep mode signalled, for example, by the presence of a synchronization signal, the display device 110 will remain in the active state S3-0. Otherwise, that is in case the computing device 170 signals the activation of a sleep mode, for example, by deactivating horizontal or vertical synchronisation signals of a display signal, the display device 110 itself will enter a sleep state S3-2.

If, in the step P3-3, the controller 140 recognizes that the proximity sensor 160 is activated, i.e., if the energy management function is provided by the display device 110 itself, it will check in a subsequent step P3-5 if an attached computer device 170 is in a sleep mode. If this is not the case, the display device 110 will enter a suspend state S3-1. In the suspend state S3-1, power consumption of the display device 110 will be reduced to a value of, for example, below 1 Watt. This can be achieved, for example, by deactivating parts of the display screen 150, in particular any backlight illumination system used to illuminate the display screen 150. However, changing the display device 110 into the suspend state S3-1 does not have an effect on the operating state of the computing device 470 such that user applications may continue uninterrupted. In the suspend state S3-1, upon detection of the presence of a user, the display device 110 will return to the active state S3-0 in a step P3-6. Otherwise, if in the step P3-5 the controller 140 detects that the attached computing device 170 has entered a sleep mode, the display device 110 will enter the sleep state S3-2 as described above.

The display device 110 will remain in the sleep state S3-2 until a connected computing device 170 signals a wake-up signal in a step P3-7. For example, the computing device 170 may reactivate synchronization signals to bring the display device 110 back into the active state S3-0. In the sleep state S3-2, the power consumption is preferably almost as low as in the off state S3-3. In contrast to the off state S3-3, at least the controller 140 needs to be provided with a standby operating energy. As detailed above with respect to state S3-3, a standby voltage may either be provided by an internal power supply unit of the display device 110 or over a graphics interface such as VGA, DVI or HDMI.

Figure 4:
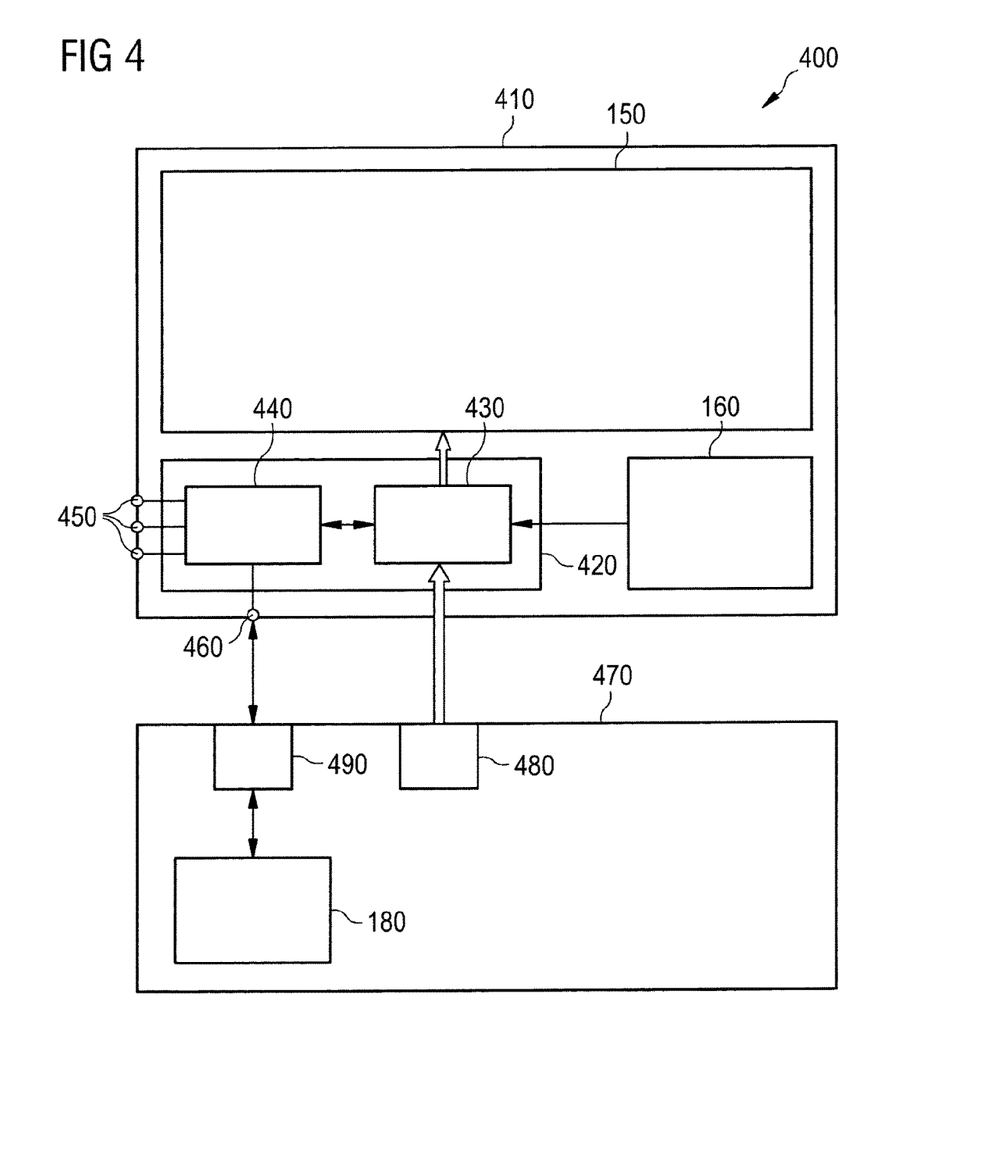
FIG. 4 shows a computer system according to a second example.

FIG. 4 shows a computer system 400 according to an alternative example. The computer system 400 comprises a display device 410 and a computing device 470. The display device 410 comprises a display screen 150 and a sensor 160 as detailed above with respect to the display device 110. In addition, the display device 410 comprises a printed circuit board 420 comprising, amongst others, a microcontroller unit 430. The microcontroller unit 430 provides, amongst others, an electrical interface (not shown) to connect the display device to an appropriate graphics controller 480 of the computing device 470.

Furthermore, the printed circuit board 420 comprises a USB hub 440. The USB hub 440 comprises several downstream ports 450 and one upstream port 460. The downstream ports 450 may be used to connect peripheral devices such as a keyboard, a printer, a scanner or a mouse to the computer system 400. The upstream port 460 connects to a USB host controller 490 of the computer device 470.

The microcontroller unit 430 provides information to the computing device 470 by USB interface. In particular, the microcontroller unit 430 may be configured to be recognized as a human interface device by the USB host controller 490 of the computing device 470. As such, control information supplied by the microcontroller unit 430 may be provided to an energy management function 180 of the computing device. For example, the microcontroller unit 430 may provide a simulated keyboard input signal or mouse input signal to the energy management function 180 of an operating system, simulating the activity of a user as long as the sensor 160 detects the proximity of a user.

The solution described with reference to FIG. 4 has the advantage that no further software components in addition to the standard energy management function 180 are required on the side of the computing device 470. However, in contrast to the solution presented with reference to FIG. 1, typically two cables are required between the display device 410 and an attached computing device 470, namely a first cable to transmit a graphics signal from the graphics controller 480 of the computing device 470 to the microcontroller unit 430 of the display device 410 and a USB cable for the exchange of information between the USB hub 430 and the USB host controller 490 of the computing device 170.

While the different energy saving states and operational modes shown in FIGS. 2 and 3, respectively, have been described with reference to the example shown in FIG. 1, attention is drawn to the fact that similar modes and sates may also be implemented in the example shown in FIG. 4. In general, the individual features described above may be combined in various ways to achieve the stated effects in accordance with the appended claims.

The invention claimed is:

1. A display device for use in a computer system comprising the display device and a computing device external to the display device, the display device comprising:
   interface circuitry configured to receive a display signal from the external computing device via at least one cable connecting the display device and the external computing device;
   a display screen configured to display the received display signal;
   a sensor configured to provide at least one control signal indicative of the presence of a user in a predefined area in front of the display screen; and
   a controller configured to control an operating state of the display device and to select an energy saving mode from a plurality of energy saving modes based at least on the control signal provided by the sensor, wherein, in operation of the display device,
   the controller immediately selects a first energy saving mode without any waiting time when an absence of the user is detected by the sensor and selects a second energy saving mode, if a presence of the user is not detected within a predetermined first time period after entering the first energy saving mode,
   and controls the operating state based on the selected energy saving mode, such that the brightness of the display screen is reduced in the first energy saving mode, and a backlight illumination unit of the display screen is completely deactivated in the second energy saving mode,
   the interface circuitry transmits first control information regarding a determination of an operating state of the external computing device via the at least one cable back to an energy management function of the external computing device when the second energy saving mode is entered, the first control information indicating the absence of a user to the energy management function of the external computing device, and
   first control information is transmitted from the controller of the display device to the energy management function of the external computing device using a manufacturer-specific virtual control panel (VCP).

2. The display device according to claim 1, wherein
   the controller selects a normal operating mode if a presence of the user is detected within the predetermined first time period, and
   returns the brightness of the display screen to an initial value.

3. The display device according to claim 1, wherein, in the second energy saving state, the screen of the computing device is locked by the external computing device in response to the first control information provided by the display device indicating the absence of the user.

4. The display device according to claim 3, wherein, if a return of the user is detected within a predetermined second time period, the backlight unit of the display screen is switched back on and a corresponding login screen is displayed to the user of the computer system.

5. The display device according to claim 4, wherein
   the controller selects a third energy saving mode if a presence of the user is not detected within the predetermined second time period, and
   the interface circuitry transmits second control information regarding a determination of an power saving state of the external computing device back to the external computing device when the third energy saving mode is entered.

6. The display device according to claim 5, wherein the power saving state of the external computing device comprises one of Advanced Configuration and Power Interface, ACPI, states "hibernate," "suspend to disk," "standby," "suspend to RAM" and "sleep."

7. The display device according to claim 5, wherein the interface circuitry transmits a control code to the external computing device to wake up the computing device from the power saving mode and return to a normal operating state if a return of the user is detected within a predetermined third time period.

8. The display device according to claim 7, wherein
   the controller selects a fourth energy saving mode if a presence of the user is not detected within the predetermined third time period, the interface circuitry transmits third control information requesting the external computing device to be fully switched off, and the controller deactivates all components of the display screen so that the return of the user can no longer be automatically detected by the display device.

9. The display device according to claim 8, wherein the fully switched-off state of the external computing device comprises the Advanced Configuration and Power Interface, ACPI state "soft off."

10. The display device according to claim 1, further comprising a timer function configured to determine the length of the absence of the user, wherein the timer function is started, when the absence of the user is detected by the sensor, and cleared when the return of the user is detected by the sensor.

11. The display device according to claim 1, wherein the interface circuitry comprises at least one of a VGA, DVI, HDMI or DP interface, and transmits the first control information based on a DDC/DI interface, in particular using the DDC2Bi protocol and/or MCCS.

12. The display device according to claim 1, wherein the interface circuitry comprises a USB controller and transmits the first control information using the USB controller to the external computing device over an upstream port of a USB hub.

13. The display device according to claim 1, wherein the first control information comprises an interrupt request, in particular an unsolicited attention call, to alert the external computing device to the selection of an energy-saving mode by the controller.

14. The display device according to claim 1, wherein the first control information comprises control data, comprising data regarding at least one of the presence of the user in the predefined area in front of the display screen; an energy saving mode selected by the controller; and a requested operating state of the external computing device.

15. The display device according to claim 1, wherein the controller selects at least one of the following operating states of the display device:
   a suspend state (S3-1), in which at least the display screen is switched off or operating with reduced brightness and at least one other circuit component of the display device, the at least one other circuit component comprising at least one of the sensor and a scaler, remain in a normal operating state;
   a sleep state (S3-2), in which both the display screen and the at least one other circuit component are switched off; and
   an off state (S3-3) or standby state, in which essentially all circuit components of the display device not required to switch the display device back into an active state (S3-0) are switched off.

16. A computer system comprising:
   the display device according to claim 1; and
   a computing device external to the display device connected to the display device via at least one cable, wherein the computing device comprises an energy management function, which in operation of the computer system, switches the computing device into an operating state based at least on the control information provided by the display device.

17. The computer system according to claim 16, wherein the energy management function reads a manufacturer-specific control variable of the display device on occurrence of at least one of an interrupt request transmitted by the display device or a timeout of a timer of the computing device.

18. A method of managing the operating states of a computer system comprising a display device connected to an external computing device via at least one cable, the method comprising:
   sensing, by a sensor of the display device, an absence of a user of the computer system from a predefined area in front of the display device;
   selecting, by a controller of the display device, a first energy saving mode from a plurality of energy saving modes immediately in response to the sensed absence of the user without any waiting time and a second energy saving mode from the plurality of energy saving modes in response expiry of a predetermined first time period after after entering the first energy saving mode;
   controlling the operating state of the display device based on the selected energy saving mode, wherein brightness of the display screen is reduced in the first energy saving mode and a backlight illumination unit of the display screen is completely deactivated in the second energy saving mode;
   transmitting control information from the display device via the at least one cable to an energy management function of the external computing device using a manufacturer specific virtual control panel (VCP) when the second energy saving mode is entered, the control information indicating the absence of a user to the energy management function of the external computing device; and
   controlling, by the energy management function of the external computing device, the operating state of the external computing device based at least on the transmitted control information.

19. The method according to claim 18, further comprising:
   sensing the presence of a user of the computer system in the predefined area in front of the display device;
   selecting, by the controller of the display device, a normal operating mode in response to the sensed presence of the user;
   controlling the operating state of the display device based on the selected normal operating mode;
   transmitting wake-up information from the display device to the external computing device; and
   controlling the operating state of the external computing device based at least on the transmitted wake-up information.

* * * * *